United States Patent
Koptyaev et al.

(10) Patent No.: US 11,470,287 B2
(45) Date of Patent: Oct. 11, 2022

(54) COLOR IMAGING APPARATUS USING MONOCHROME SENSORS FOR MOBILE DEVICES

(71) Applicant: SAMSUNG ELECTRONICS CO., LTD., Suwon-si (KR)

(72) Inventors: Sergey Nikolaevich Koptyaev, Nizhnii Tagil (RU); Anton Sergeevich Medvedev, Krasnozavodsk (RU); Maxim Vladimirovich Riabko, Moscow (RU); Alexey Andreevich Shchekin, Moscow (RU); Aleksandr Sergeevich Shorokhov, Tula (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/112,316

(22) Filed: Dec. 4, 2020

(65) Prior Publication Data
US 2021/0176436 A1 Jun. 10, 2021

(30) Foreign Application Priority Data
Dec. 5, 2019 (RU) .............................. 2019139781
Nov. 5, 2020 (KR) ........................ 10-2020-0147097

(51) Int. Cl.
*H04N 9/04* (2006.01)
*H04N 5/232* (2006.01)

(52) U.S. Cl.
CPC ....... *H04N 9/0455* (2018.08); *H04N 5/23229* (2013.01)

(58) Field of Classification Search
CPC ............. H04N 9/0455; H04N 5/23229; H04N 5/2254; H04N 9/07; H04N 9/0452
See application file for complete search history.

(56) References Cited

U.S. PATENT DOCUMENTS

| | | | |
|---|---|---|---|
| 4,322,740 A | 3/1982 | Takemoto et al. | |
| 4,975,737 A * | 12/1990 | Murooka | H04N 1/6027 355/35 |

(Continued)

FOREIGN PATENT DOCUMENTS

| | | |
|---|---|---|
| EP | 1 871 091 A2 | 12/2007 |
| RU | 191 753 U1 | 8/2019 |

(Continued)

OTHER PUBLICATIONS

Oliver Cossairt et al., "Spectral Focal Sweep: Extended Depth of Field from Chromatic Aberrations", IEEE International Conference on Computational Photography, 2010, 8 pages total.

(Continued)

*Primary Examiner* — Hung H Lam
(74) *Attorney, Agent, or Firm* — Sughrue Mion, PLLC (57) ABSTRACT

A color imaging apparatus includes a filter having a meta surface, and configured to transmit only light in a first spectral region, a second spectral region and a third spectral region in a time sequence, a monochrome sensor on which the filter is disposed, and configured to acquire three different monochrome images in the time sequence by being consecutively exposed three times in synchronization with the filter, and a processor configured to acquire one color image by merging the three different monochrome images.

20 Claims, 10 Drawing Sheets

(56) References Cited

U.S. PATENT DOCUMENTS

| | | |
|---|---|---|
| 5,214,503 A | 5/1993 | Chiu et al. |
| 6,137,100 A | 10/2000 | Fossum et al. |
| 8,330,840 B2 | 12/2012 | Lenchenkov |
| 9,465,221 B2 | 10/2016 | Webster et al. |
| 9,497,370 B2 | 11/2016 | Venkataraman et al. |
| 10,229,476 B2 | 3/2019 | Mendlovic et al. |
| 2003/0151675 A1 | 8/2003 | la Grone et al. |
| 2005/0134712 A1 | 6/2005 | Gruhlke et al. |
| 2006/0054782 A1 | 3/2006 | Olsen et al. |
| 2007/0046794 A1 | 3/2007 | He et al. |
| 2007/0206241 A1 | 9/2007 | Smith et al. |
| 2007/0291982 A1 | 12/2007 | Sung et al. |
| 2009/0141320 A1* | 6/2009 | Minamino ........... H04N 1/3875 358/512 |
| 2009/0237493 A1 | 9/2009 | Berestov |
| 2009/0295962 A1 | 12/2009 | Rhodes et al. |
| 2012/0188409 A1 | 7/2012 | Gallagher et al. |
| 2015/0177524 A1 | 6/2015 | Webster et al. |
| 2015/0373261 A1 | 12/2015 | Rodda et al. |
| 2017/0041574 A1 | 2/2017 | Tanaka |
| 2017/0199425 A1* | 7/2017 | Nam ....................... G02F 1/137 |
| 2018/0059440 A1* | 3/2018 | Yu .......................... G11C 13/04 |
| 2020/0241262 A1* | 7/2020 | Bodkin ................. G01J 3/0208 |
| 2020/0395521 A1* | 12/2020 | Brodoceanu ........ H01L 33/0095 |

FOREIGN PATENT DOCUMENTS

| | | |
|---|---|---|
| WO | 2013/036648 A1 | 3/2013 |
| WO | 2014/150856 A1 | 9/2014 |
| WO | 2014/207742 A2 | 12/2014 |

OTHER PUBLICATIONS

Communication dated Jun. 18, 2020 issued by the Russian Patent Office in Russian Application No. 2019139781.

Communication dated Jun. 16, 2020 issued by the Russian Patent Office in Russian Application No. 2019139781.

* cited by examiner

COLOR IMAGING APPARATUS USING MONOCHROME SENSORS FOR MOBILE DEVICES

CROSS-REFERENCE TO RELATED APPLICATIONS

This application is based on and claims priority under 35 U.S.C. § 119 to Russian Patent Application No. 2019139781, filed on Dec. 5, 2019, in the Russian Patent Office, and Korean Patent Application No. 10-2020-0147097, filed on Nov. 5, 2020, in the Korean Intellectual Property Office, the disclosures of which are incorporated by reference herein in their entireties.

BACKGROUND

1. Field

The disclosure relates to the imaging field, and more particularly, to color imaging devices.

2. Description of Related Art

A currently used color image sensor has smaller resolution than a monochrome sensor. A color image sensor has a limited dynamic range for measuring the strength of an optical signal. The signal-to-noise ratio of a color image sensor used in mobile form factors or devices is also low due to a decreased pixel size. As the pixel size is decreased, a cross-noise may occur between adjacent pixels due to mutual influence on each other. Also, chromatic aberration may be observed over an entire spectrum. When manufacturing color image sensors, additional technical operations may be required to manufacture a Bayer filter.

Also, since a transmission curve of a filter including a polymer material is quite wide, blue, green, and red spectral ranges may overlap. Consequently, a complicated color image recovery algorithm are used. That is, when a signal received from sensors is subsequently processed, an algorithm that corrects an image is used, and as a result, many artifacts may occur. That is, the operation loads on a processor may increase. Also, due to this conversion, color rendering, that is, color distortion, may be observed.

Recently, a 3-CCD camera has been widely used, and color separation of white light beams in this camera is performed by a 3-CCD dichroic prism that implements a color separation technique is a color television by using three photosensitive matrices or transmission tubes that are separated for each image divided into three colors in red, green and blue spectral ranges. This technique is based on optical color separation by using a dichroic prism that splits light generated due to interference and emitted from a lens into three images according to wavelengths. This type of camera and a camcorder using this camera are also referred to as a tri-matrix.

The principle of operation of such a camera is that light from a photographing lens is incident on a color-splitting dichroic prism and is split into three light-stream components directed to the other side of the dichroic prism. Light having the shortest wavelength is selectively reflected by a coating surface of the dichroic prism while the remaining light is transmitted through the coating surface. Accordingly, a blue component of the light is directed to a lower output surface. Next, another coated side of the dichroic prism separates light of a long wavelength, that is, a red part of a spectrum that falls to an upper output surface of the dichroic prism. The remaining light that passes through all coating surfaces corresponds to a green part of the spectrum and reaches a rear output surface of the dichroic prism. The three outputs of the design have three independent monochrome sensors that measure each of the three color components.

Accordingly, three monochromatic real images of a subject may be acquired. Red light and blue light may generate direct (non-mirror) images of these colors through double reflection. Each of the images separated by these colors belongs to a separate matrix, and after processing the separate matrix, a video signal is added to a corresponding matrix, and then, an entire signal is generated. A complete color signal may be acquired as a result of summing signals from the three matrices. The camera described above has the same resolution as a monochrome sensor that has a resolution four times greater than that of a color sensor widely used with a Bayer filter.

Another alternative is doubling the pixel size while maintaining the original resolution. Moreover, the greater the size of the pixel, the smaller the noise, that is, a larger dynamic range of optical signal intensity may be provided. A beam splitting prism, unlike the Bayer filter, provides high-quality separation of red, blue, and green colors, and thus, a special algorithmic process is not required for recovery of a color image and high color quality may be ensured without interpolation.

A bulky design may be recognized as a drawback of the camera, and the design may not be compatible with mobile devices, such as mobile phones, tablets, and cameras. Sophisticated hardware is used in mobile devices, and as a result, power consumption may increase.

In cameras for modern mobile devices, a mask filter of the same type as the Bayer filter that is compatible with mobile phones is designed to be compact. In this case, the number of effective pixels may be reduced by four or more.

Also, since a small filter that causes distortion of an image color is used, RGB spectral regions may greatly overlap one another. Since it may be necessary to use a Bayer process for color interpolation, the sharpness of an image may be reduced. In addition, noise may increase, and a dynamic range of an optical signal strength may decrease as compared to a monochrome sensor of the same design.

U.S. Pat. No. 4,322,740 (issued on Mar. 30, 1982) discloses a solid-state curly imaging camera. The solid-state curly imaging camera may include three solid-state image sensors, each having a two-dimensional pixel arrangement with a predetermined pitch in vertical and horizontal directions. First, second and third image sensors may be used for illumination of green light G, red light R, and blue light B. An optical position of the first image sensor is shifted with respect to the second and third image sensors by half a pixel pitch in the vertical direction. A pentaprism may be used as a splitter element. The pentaprism may well separate R, G, and B spectral ranges not overlap. The biggest drawback of the solid-state curly imaging camera is that a system including such a camera is bulky and incompatible with mobile devices.

U.S. Pat. No. 5,214,503 A (issued Jan. 31, 1992) discloses a color night vision camera system. The color night vision camera system provides color night vision for reconnaissance use, etc. The color night vision camera system may include a first lens, a mirror sub-assembly for dividing a lens image into three images, and a filter sub-assembly for filtering the three images, respectively, through a red filter, a green filter, and a blue filter. Also, the color night vision camera system may further include first, second and third intensifiers respectively having first, second and third camera units that transmit 3 image signals in series to a display monitor on which a color image is displayed after viewing the 3 images. A drawback of the color night vision camera system is that it may require bulky optical elements that are not compatible with mobile devices.

US 2009/237493 A1 (issued Jan. 9, 2006) discloses shared color sensors for a high-resolution 3D camera. In one embodiment, an apparatus for acquiring a three-dimensional (3-D) image may include: first and second lenses configured to receive light from a scene, that is, from a region displayed by a video camera; first, second, third and fourth sensors; a first beam splitter that is arranged adjacent to the first lens provides a first split beam to a first sensor and a second split beam to a second sensor; a second beam splitter that is arranged adjacent to the second lens and provides a third split beam to the third sensor and a fourth split beam to the fourth sensor. A drawback of the high-resolution 3D camera is that it may require bulky optical elements that are not compatible with mobile devices.

US 2015/177524 A1 (issued on Jun. 25, 2015) discloses a digital camera including a light splitter. The digital camera may include a light splitter cube having an incident surface that receives incident light from a camera scene. The light splitter cube divides incident light into first, second, and third color components through first, second and third surfaces of the light splitter cube, respectively. First, second, and third image sensors may be disposed at positions to receive respective color components emerging from the first, second and third surfaces of the light splitter cube. The digital camera may further include first, second and third image sensors positioned to receive each of the color components emerging from the first, second and third emission surfaces of the light splitter cube; a deflector positioned to deflect incident light from a camera scene toward the light splitter cube; and a zoom lens system completely positioned in a path of the incident light deflected between the deflector and the incident surface of the light splitter cube.

The zoom lens system of the digital camera may include elements that are difficult to manufacture. Theoretically, the digital camera may be compatible with mobile devices, however, as an additional "attachment" form factor, it is difficult to install such a in a mobile phone or tablet due to the bulky optical elements.

SUMMARY

Provided are color imaging apparatuses having a CMOS sensor with improved resolution and a high signal-to-noise ratio (SNR) applicable to light.

Provided are color imaging apparatuses for mobile devices.

Additional aspects will be set forth in part in the description that follows and, in part, will be apparent from the description, or may be learned by practice of the presented embodiments of the disclosure.

According to an aspect of an embodiment, a color imaging apparatus includes a filter having a meta surface, and configured to transmit only light in a first spectral region, a second spectral region and a third spectral region in a time sequence, a monochrome sensor on which the filter is disposed, and configured to acquire three different monochrome images in the time sequence by being consecutively exposed three times in synchronization with the filter; and a processor configured to acquire one color image by merging the three different monochrome images.

The filter may include a first band-pass filter configured to filter light in the first spectral region, a second band-pass filter configured to filter light in the second spectral region, and a third band-pass filter configured to filter light in the third spectral region. The first band-pass filter, the second band-pass filter and the third band-pass filter may be disposed to overlap each other in a light traveling direction.

Each of the first band-pass filter, the second band-pass filter and the third band-pass filter may be configured to operate in a transmission mode in which all of incident light is transmitted according to an electrical signal, and a filtering mode in which light in a corresponding spectral region is filtered.

The filter may be further configured to, based on one among the first band-pass filter, the second band-pass filter and the third band-pass filter being in a transmission mode and a remaining two among the first band-pass filter, the second band-pass filter and the third band-pass filter being in a filtering mode, transmit light in a spectral region corresponding to the one among the first band-pass filter, the second band-pass filter and the third band-pass filter in the transmission mode.

Each of the first band-pass filter, the second band-pass filter and the third band-pass filter may include a repetitive periodic structure, and the repetitive periodic structure of each of the first band-pass filter, the second band-pass filter and the third band-pass filter may be different from one another and defines light in a spectral region to be filtered.

The repetitive periodic structure of each of the first band-pass filter, the second band-pass filter and the third band-pass filter may be arranged in a direction crossing a light traveling direction.

A period of each of the repetitive periodic structure of each of the first band-pass filter, the second band-pass filter and the third band-pass filter may be less than a wavelength of light to be filtered.

Each of the first band-pass filter, the second band-pass filter and the third band-pass filter may include nanoparticles having a size less than a wavelength of light to be filtered.

The nanoparticles included in each of the first band-pass filter, the second band-pass filter and the third band-pass filter may have different sizes from each other.

The nanoparticles may include any one or any combination of Si, $TiO_2$, GaP, GaN, SiC, $ZrO_2$, and GaAs.

The nanoparticles included in each of the first band-pass filter, the second band-pass filter and the third band-pass filter may be arranged in different cycles from one another.

A size of the nanoparticles included in the first band-pass filter may be in a range from about 250 nm to about 500 nm.

A size of the nanoparticles included in the second band-pass filter may be in a range from about 200 nm to about 400 nm.

A size of the nanoparticles included in the third band pass filter may be in a range from about 190 nm to about 300 nm.

Each of each of the first band-pass filter, the second band-pass filter and the third band-pass filter may further include a refractive index change layer having a refractive index that is changed according to an applied electrical signal, and an electrode pair configured to apply an electrical signal to the refractive index change layer.

The refractive index change layer may be in contact with the nanoparticles.

The nanoparticles may be spaced apart from the electrode pair.

One among the electrode pair of the second band-pass filter may be shared with one among the electrode pair of the first band-pass filter, and another one among the electrode pair of the second band-pass filter may be shared with one among the electrode pair of the third band-pass filter.

The color imaging apparatus may further include an insulating layer disposed either one or both of between the first band-pass filter and the second band-pass filter and between the second band-pass filter and the third band-pass filter.

The processor may be further configured to acquire the one color image by separating the three different monochrome images and merging the separated three different monochrome images.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the embodiments may have different forms and may not be construed as being limited to the descriptions set forth herein. Accordingly, the embodiments are described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, reference will now be made in detail to embodiments, examples of which are illustrated in the accompanying drawings. The embodiments of the inventive concept are capable of various modifications and may be embodied in many different forms. In the drawings, like reference numerals refer to like elements throughout and sizes of elements in the drawings may be exaggerated for clarity and convenience of explanation.

Hereinafter, when an element or layer is referred to as being "on" or "above" another element or layer, the element or layer may be directly on another element or layer or intervening elements or layers.

It will be understood that, although the terms "first", "second", etc. may be used herein to describe various elements, these terms are only used to distinguish one element from another. These terms do not limit the difference of a material or structure of constituent elements.

In the following embodiments, the singular forms include the plural forms unless the context clearly indicates otherwise. It may be understood that, when a part "comprises" or "includes" an element in the specification, unless otherwise defined, it is not excluding other elements but may further include other elements.

The term "above" and similar directional terms may be applied to both singular and plural.

The operations of all methods described herein may be performed in any suitable order unless otherwise indicated herein or otherwise clearly contradicted by context. All examples or example terms (for example, etc.) are simply used to explain in detail the technical scope of the inventive concept, and thus, the scope of the inventive concept is not limited by the examples or the example terms as long as it is not defined by the claims.

Figure 1:
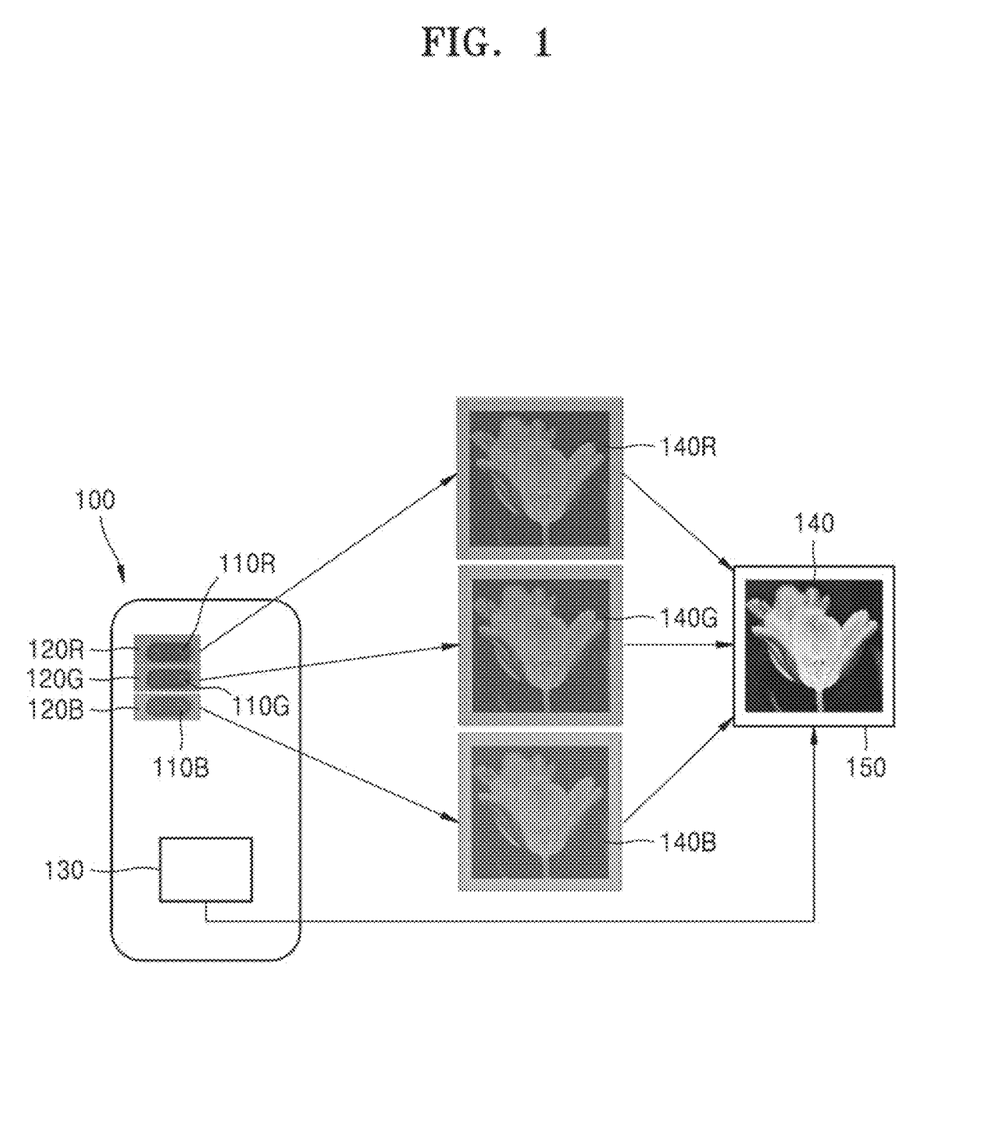
FIG. 1 is a diagram for explaining a color imaging apparatus including three monochrome sensors according to an embodiment.

FIG. 1 is a diagram for explaining a color imaging apparatus 100 including three monochrome sensors according to an embodiment. Referring to FIG. 1, the color imaging apparatus 100 may include a plurality of monochrome sensors 110R, 110G, and 110B for color imaging. The plurality of monochrome sensors 110R, 110G, and 110B may be arranged parallel to each other.

Each of the plurality of monochrome sensors 110R, 110G, and 110B may include a plurality of pixels. All pixels of each of the plurality of monochrome sensors 110R, 110G, and 110B may have the same color range. For example, the first monochrome sensor 110R may sense light in a red spectrum range, the second monochrome sensor 110G may sense light in a green spectrum range, and the third monochrome sensor 110B may sense light in a blue spectrum range.

Each of the plurality of monochrome sensors 110R, 110G, and 110B is covered with unique monochromatic interference filters 120R, 120G, and 120B. That is, each of the monochromatic interference filters 120R, 120G, and 120B is disposed to cover the corresponding monochrome sensors 110R, 110G, and 110B one by one to prevent overlapping of spectrums or reduce the overlap of the spectrums. In this way, the light transmitted through each of the monochromatic interference filters 120R, 120G, and 120B may be completely divided into red, green, and blue spectral ranges and incident on the corresponding monochrome sensors 110R, 110G, and 110B.

In the embodiment, the color imaging apparatus 100 may be used in a mobile device.

The color imaging apparatus 100 may further include a processor 130 for processing signals received from the plurality of monochrome sensors 110R, 110G, and 110B. To display one color image 140 on a display 150, the processor 130 may acquire one color image by algorithmically converting images 140R, 140G, and 140B received from the plurality of monochrome sensors 110R, 110G, and 110B and may control the display 150 so that the color image 140 is displayed on the display 150.

In the embodiment, the processor 130 may algorithmically merge images received from the three spatially separated monochrome sensors 110R, 110G, and 110B.

Figure 2:
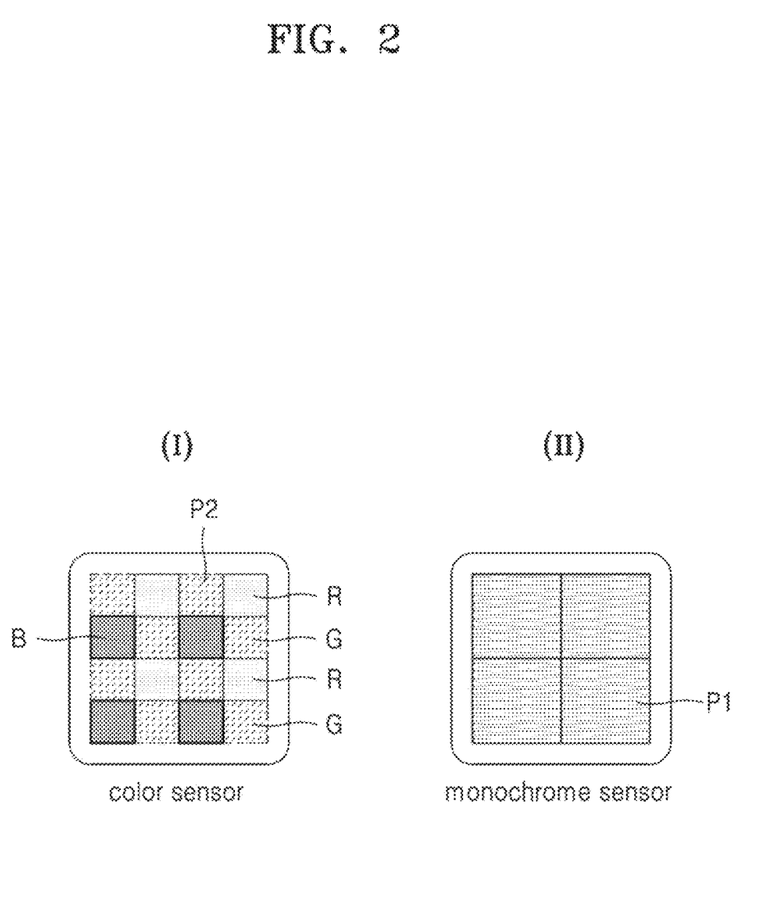
FIG. 2 is a diagram illustrating an image sensor including a plurality of pixels of a mobile form factor according to an embodiment.

FIG. 2 is a diagram illustrating an image sensor including a plurality of pixels of a mobile form factor according to an embodiment. In FIG. 2, diagram (I) shows a color sensor of a mobile form factor, and diagram (II) shows a monochrome sensor having the same resolution as the color sensor of FIG. 2. As shown in the drawing, it may be seen that a pixel size P1 included in the monochrome sensor is two or more times greater than a pixel size P2 included in the color sensor.

Filters 120R, 120G, and 120B in red, green, and blue color ranges may be used as monochrome filters with respect to monochrome sensors 110R, 110G, and 110B, respectively. It is also possible to use a near-ultraviolet filter as a filter for one of the monochrome sensors.

Figure 3:
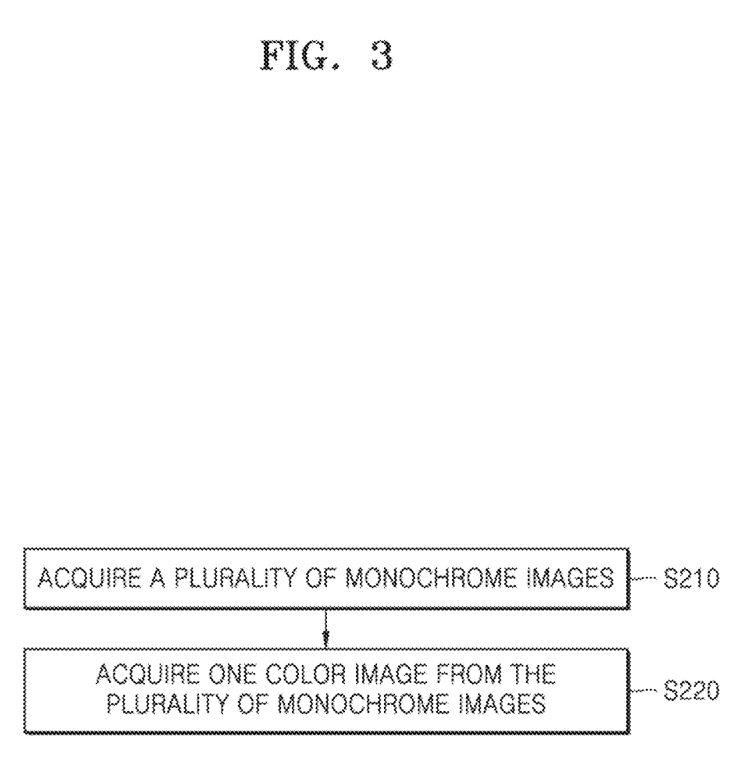
FIG. 3 is a flowchart illustrating an operating method of a color imaging apparatus according to an embodiment.

FIG. 3 is a flowchart illustrating a method of operating the color imaging apparatus 100 according to an embodiment.

In operation S210, each of the plurality of monochrome sensors 110R, 110G, and 110B may acquire monochrome images 140R, 140G, and 140B. The monochrome sensors 110R, 110G, and 110B may be exposed once to acquire an image of interest to the user, and each of the monochrome sensors 110R, 110G, and 110B may acquire monochrome images 140R, 140G, and 140B corresponding to red, green, and blue spectrum ranges, respectively. When an optical signal corresponding to an object of interest passes through the monochromatic interference filters 120R, 120G, and 120B, each of the monochromatic interference filters 120R, 120G, and 120B may filter the optical signal so that only optical signals corresponding to the red, green, and blue spectrum ranges are incident on the corresponding monochrome sensors 110R, 110G, and 110B. Thus, each of the monochrome sensors 110R, 110G, and 110B may acquire monochrome images 140R, 140G, and 140B.

In operation S220, the processor 130 may acquire one color image 140 from a plurality of monochrome images 140R, 140G, and 140B. The processor 130 may perform a conversion algorithm for converting a plurality of monochrome images 140R, 140G, and 140B received from the plurality of monochrome sensors 110R, 110G, and 110B into one color image 12. Since the monochrome sensors 110R, 110G, and 110B are spatially separated, the monochrome images 140R, 140G, and 140B of the same object acquired by the monochrome sensors 110R, 110G, and 110B may be spatially offset with respect to each other. In this case, when merging the monochrome images 140R, 140G, and 140B into the one color image 12, the processor 130 may compensate for the offset by shifting any one or any combination of the plurality of monochrome images 140R, 140G, and 140B.

Figure 4:
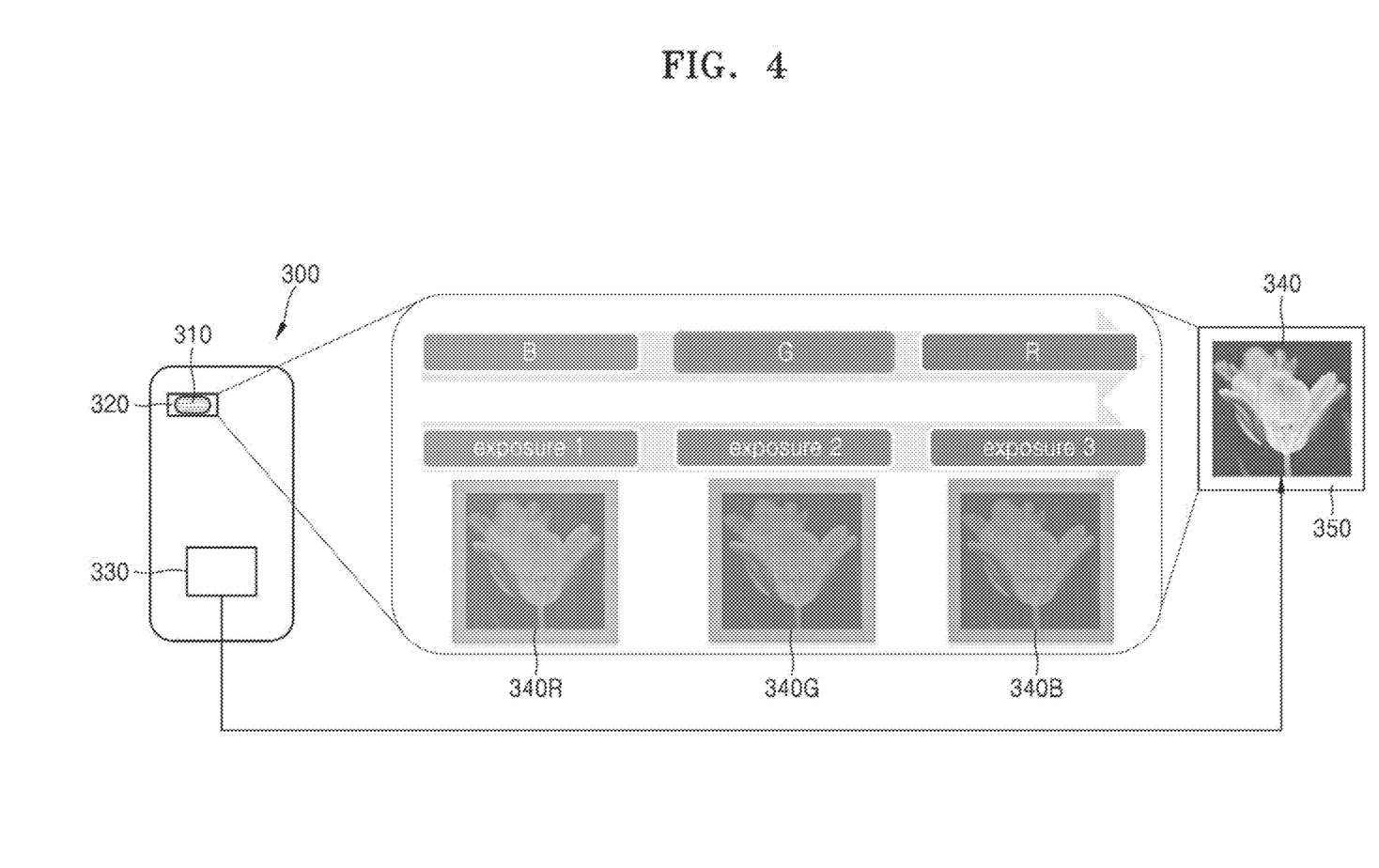
FIG. 4 is a diagram of a color imaging apparatus according to an embodiment.
Figure 5:
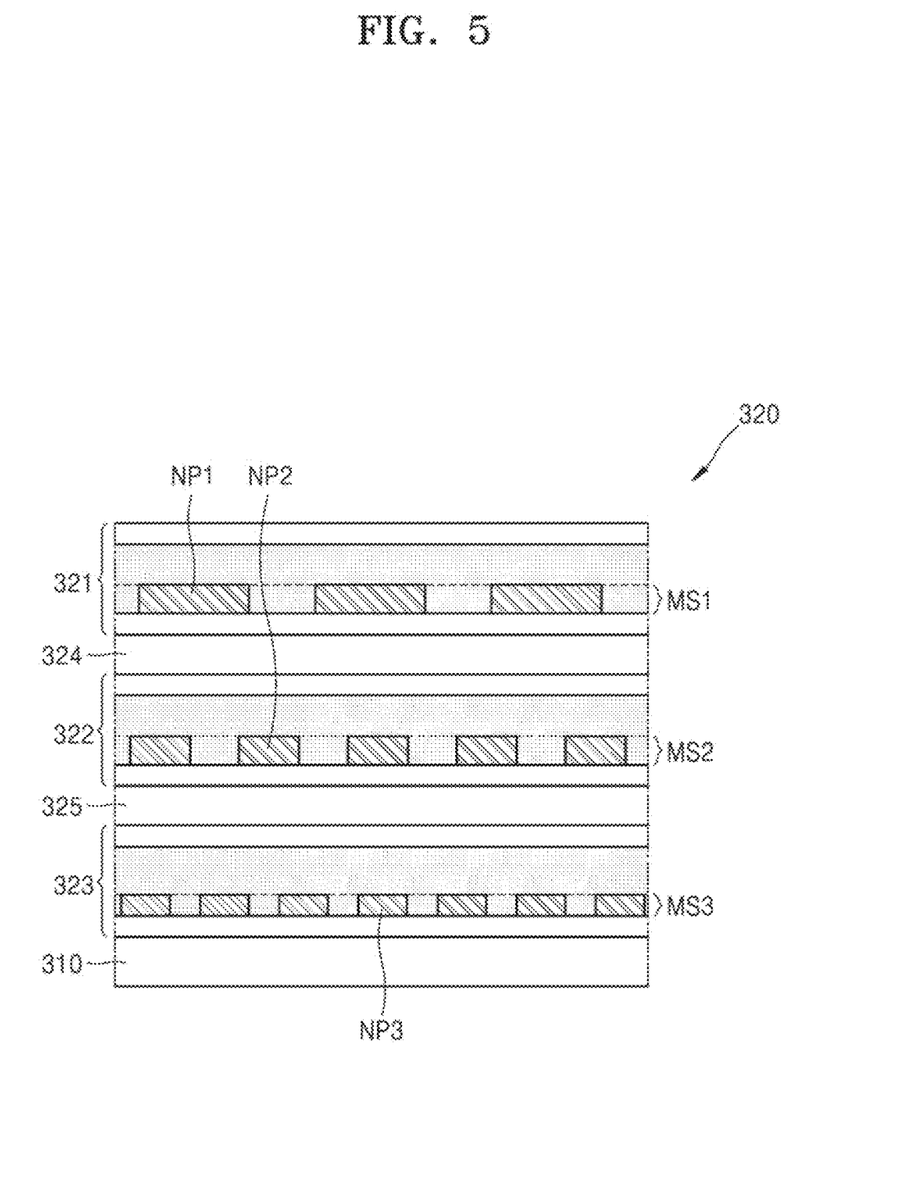
FIG. 5 is a diagram showing the structure of a monochrome sensor and a filter of FIG. 4.

FIG. 4 is a diagram of a color imaging apparatus 300 according to an embodiment, and FIG. 5 is a diagram showing the structure of a monochrome sensor 310 and a filter 320 of FIG. 4

As depicted in FIGS. 4 and 5, the color imaging apparatus 300 may include the filter 320 that time sequentially transmits only light in first, second, and third spectral regions. Also, the color imaging apparatus 300 may include the monochrome sensor 310 that is disposed on a bottom of the filter 320 and acquires three different monochrome images in time sequence by being consecutively exposed three times in synchronization with the filter 320.

The filter 320 may include first to third band-pass filters 321, 322, and 323 that filter light of different spectrums. For example, the filter 320 may include the first band-pass filter 321 for filtering light in a first spectral region, the second band-pass filter 322 for filtering light in a second spectral region, and the third band-pass filter 323 for filtering light in a third spectral region. The first to third band-pass filters 321, 322, and 323 are disposed to overlap each other based on a light traveling direction, and may be disposed on a surface of the monochrome sensor 310.

Each of the first to third band-pass filters 321, 322, and 323 has meta-surfaces MS1, MS2, and MS3, and each may be configured to filter a spectral region of incident light. For example, the first band-pass filter 321 may filter light in a red spectrum, the second band-pass filter 322 may filter light in a green spectrum, and the third band-pass filter 323 may filter light in a blue spectrum.

Boundaries between the first to third band-pass filters 321, 322, and 323 are determined by geometric parameters of the meta-surfaces MS1, MS2, and MS3, and the geometrical parameters may include a size of first to third nanoparticles NP1, NP2, and NP3 and an arrangement period of the first to third nanoparticles NP1, NP2, and NP3.

In the embodiment, the color imaging apparatus 300 may be used in a mobile device.

The color imaging apparatus 300 may further include a processor 330 that controls the filter 320 and the monochrome sensor 310 and acquires one color image 340 for a display 350 by separating and merging three monochrome images 340R, 340G, and 340B acquired by exposure of the monochrome sensor 310. The separation may be performed by controlling a pulse duration and duty cycle of the monochrome sensor 310 for acquiring the monochrome images 340R, 340G, and 340B.

Each of the first to third band-pass filters 321, 322, and 323 includes a repeated periodic structure, and the periodic structure may have various sizes and define a spectral region of light to be filtered. The size of each periodic structure may be less than a wavelength of light to be filtered. The repetitive periodic structure described above may be the meta-surfaces MS1, MS2, and MS3.

Each of the first to third band-pass filters 321, 322, and 323 may include first to third nanoparticles NP1, NP2, and NP3 that are less than a wavelength of light to be filtered. The first to third nanoparticles NP1, NP2, and NP3 included in each of the first to third band-pass filters 321, 322, and 323 may have different sizes.

The first band-pass filter 321 may include first nanoparticles NP1 having a size of about 350 to 500 nm, and the first band-pass filter 321 may filter red light. The second band-pass filter 322 may include second nanoparticles NP2 having a size of about 300 to 400 nm, and the second band-pass filter 322 may filter green light. The third band-pass filter 323 may include third nanoparticles NP3 having a size of about 190-300 nm, and the third band-pass filter 323 may filter blue light.

The first to third nanoparticles NP1, NP2, and NP3 may include any one or any combination of Si, $TiO_2$, GaP, GaN, SiC, $ZrO_2$, and GaAs.

Each of the band-pass filters 321, 322, and 323 may include a transmission mode for transmitting incident light and a filtering mode for filtering light of a spectrum.

Figure 6:
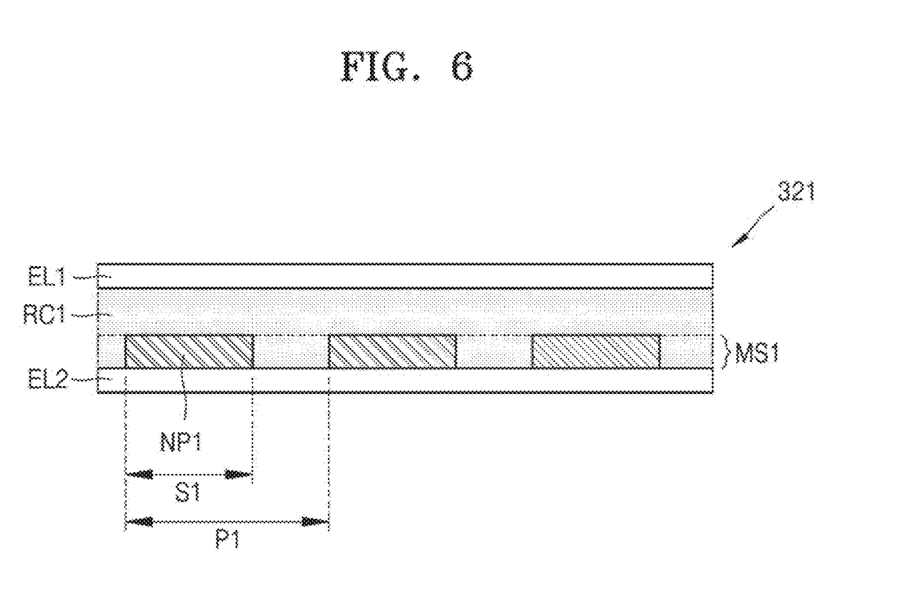
FIG. 6 is a diagram illustrating a structure of a first band-pass filter according to an embodiment.

FIG. 6 is a diagram illustrating a structure of the first band-pass filter 321 according to an embodiment. As shown in FIG. 6, the first band-pass filter 321 may include a first electrode pair EL1 and EL2 spaced apart from each other, and a first refractive index change layer RC1 disposed between the first electrode pair EL1 and EL2. The first refractive index change layer RC1 may be a layer of changing refractive index according to an electrical signal applied to the first electrode pair EL1 and EL2. The first refractive index change layer RC1 may be a layer of changing permittivity according to an electrical condition. The charge concentration (charge density) of region(s) in the first refractive index change layer RC1 may be changed according to an electric field applied to the first refractive index change layer RC1, and thus, the permittivity of the first refractive index change layer RC1 may be changed.

For example, the first refractive index change layer RC1 may include a transparent conductive oxide (TCO), such as indium tin oxide (ITO), indium zinc oxide (IZO), aluminum zinc oxide (AZO), gallium zinc oxide (GZO), aluminum gallium zinc oxide (AGZO), and gallium indium zinc oxide (GIZO). Alternatively, the first refractive index change layer RC1 may include a transition metal nitride, such as TiN, ZrN, HfN, and TaN. Besides above, the first refractive index change layer RC1 may include an electro-optic (EO) material, an effective dielectric constant of which changes when an electrical signal is applied. The EO material may include, for example, a crystalline material, such as $LiNbO_3$, $LiTaO_3$, potassium tantalate niobate (KTN), and lead zirconate titanate (PZT), or may include various polymers having electro-optical properties. The first refractive index change layer RC1 may be a semiconductor layer, a conductor layer, or a dielectric layer. The first refractive index change layer RC1 may be transparent or substantially transparent.

The first band-pass filter 321 may include a plurality of first nanoparticles NP1 disposed between the first electrode pair EL1 and EL2. The plurality of first nanoparticles NP1 may be disposed in contact with the first refractive index change layer RC1. The first nanoparticles NP1 may be periodically arranged, and the period P1 in which the first nanoparticles NP1 are arranged may be less than a wavelength of light to be filtered (e.g., red light). Also, the size S1 of the first nanoparticles NP1 may also be less than a wavelength of light to be filtered. The first nanoparticles NP1 may include any one or any combination of Si, $TiO_2$, GaP, GaN, SiC, $ZrO_2$, and GaAs.

Figure 7A:
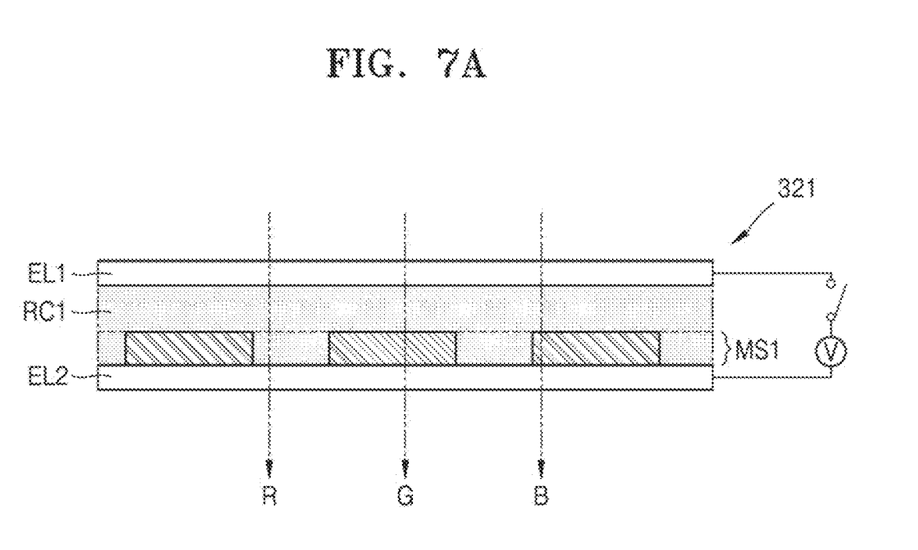
FIG. 7A is a reference diagram for explaining a case in which the first band pass filter of FIG. 6 is in a transmission mode.

FIG. 7A is a reference diagram for explaining a case in which the first band-pass filter 321 of FIG. 6 is in a transmission mode. As shown in FIG. 7A, when a voltage is not applied between the first electrode pair EL1 and EL2, an effective refractive index of the first refractive index change layer RC1 and an effective refractive index of the first nanoparticles NP1 may be the same. Light incident on the first band-pass filter 321 may proceed without being refracted at a boundary between the first refractive index change layer RC1 and the first nanoparticles NP1, that is, the meta-surface MS1. Thus, the first band-pass filter 321 is in a transmission mode.

Light incident on the first band-pass filter 321 may be light including red, green, and blue spectra, and the first band-pass filter 321 may transmit light in all spectral regions.

Figure 7B:
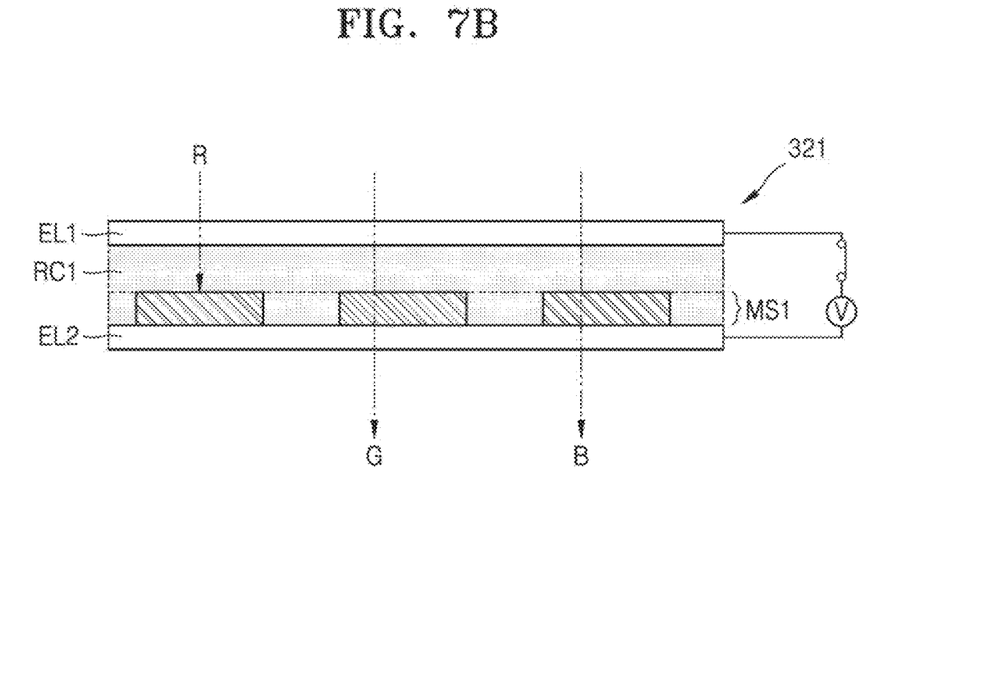
FIG. 7B is a reference diagram for explaining a case in which the first band pass filter of FIG. 6 is in a filtering mode.

FIG. 7B is a reference diagram for explaining a case in which the first band-pass filter 321 of FIG. 6 is in a filtering mode. As shown in FIG. 7B, when a voltage is applied between the first electrode pair EL1 and EL2, the effective refractive index of the first refractive index change layer RC1 and the effective refractive index of the first nanoparticles NP1 are different from each other. Thus, a difference in refractive index occurs at the boundary between the first refractive index change layer RC1 and the first nanoparticles NP1, that is, at the meta-surface MS1, and thus, among light incident on the first band-pass filter 321, light of a wavelength, for example, light having a red wavelength may not be transmitted since the light is refracted, scattered, reflected, absorbed, etc. at the meta-surfaces MS1, MS2, and MS3. On the other hand, among the light incident on the first band-pass filter 321, light having a different wavelength, that is, light having a green wavelength or a blue wavelength, passes through the meta-surface MS1. The first band-pass filter 321 is in a filtering mode for filtering red wavelength light.

In FIGS. 7A and 7B, when an electrical signal is not applied to the first refractive index change layer RC1, the first band-pass filter 321 is referred to as a transmission mode, and when an electrical signal is applied thereto, the first band-pass filter 321 is referred to as a filtering mode, but is not limited thereto. When an electrical signal is not applied to the first refractive index change layer RC1, the first band-pass filter 321 may be in a filtering mode, and when an electrical signal is applied, the first band-pass filter 321 may be in a transmission mode. According to the magnitude of the electrical signal, the first band-pass filter 321 may be in a transmission mode or in a filtering mode.

Like the first band-pass filter 321, the second and third band-pass filters 322 and 323 may have a transmission mode and a filtering mode. For example, the second band-pass filter 322 may filter light of a green wavelength in a filtering mode, and the third band-pass filter 323 may filter light of a blue wavelength in the filtering mode. The periodic structures of the second and third nanoparticles NP2 and NP3 included in the second and third band-pass filters 322 and 323 may vary according to filtering spectral regions. However, a material of refractive index change layers included in the second and third band-pass filters 322 and 323 may be the same as or different from the first refractive index change layer RC1.

Thus, if any one of the first to third band-pass filters 321, 322, and 323 is in a transmission mode and the other two band-pass filters are in a filtering mode, the filter 320 may transmit light in a spectral region filtered by one of the two band-pass filters in the transmission mode. For example, when the first band-pass filter 321 is in a transmission mode and the second and third band-pass filters 322 and 323 are in a filtering mode, the filter 320 may transmit light of a red wavelength. In addition, when the second band-pass filter 322 is in a transmission mode, and the first and third band-pass filters 321 and 323 are in a filtering mode, the filter 320 may transmit green wavelength light, and when the third band-pass filter 323 is in a transmission mode and the first and second band-pass filters 321 and 322 are in a filtering mode, the filter 320 may transmit blue wavelength light.

In FIG. 5, it is depicted that the first to third band pass filters 321, 322, and 323 are spaced apart from each other with insulating layers 324 and 325 therebetween. However, the embodiment is not limited thereto. An electrode pair of the second band-pass filter 322 may be shared with one of electrode pairs of the first and third band-pass filters 321 and 323.

Figure 8:
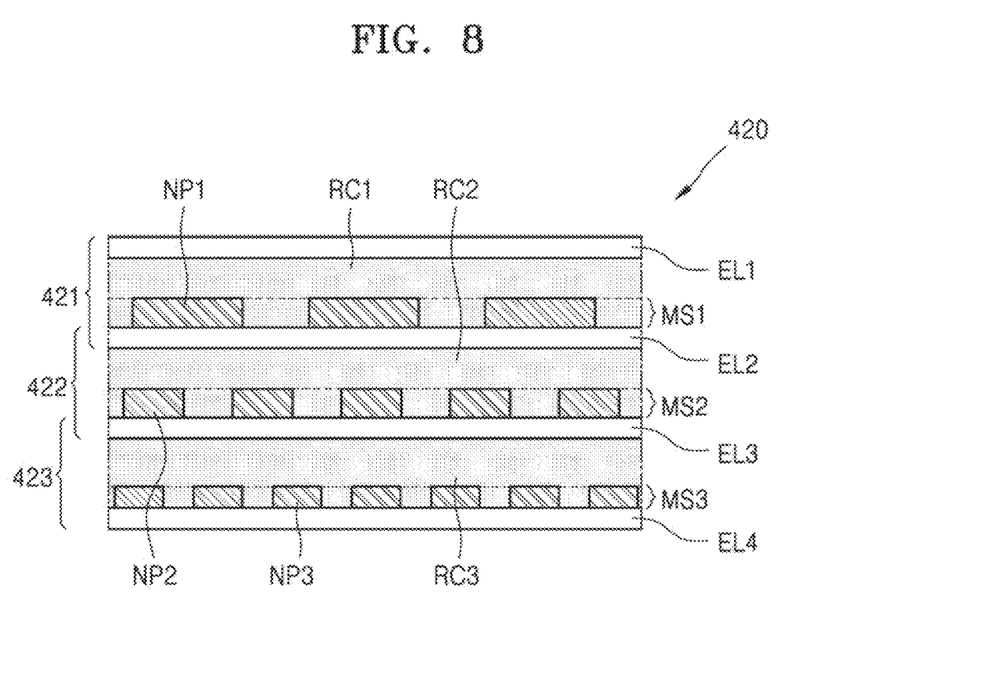
FIG. 8 is a diagram illustrating a filter according to another embodiment.

FIG. 8 is a diagram illustrating a filter 420 according to another embodiment. As shown in FIG. 8, the filter 420 may include first to third filter regions 421, 422, and 423 that are sequentially spaced apart in a light traveling direction. The first filter region 421 may include the first refractive index change layer RC1 and the plurality of first nanoparticles NP1, the second filter region 422 may include a second refractive index change layer RC2 and a plurality of second nanoparticles NP2, and the third filter region 423 may include a third refractive index change layer RC3 and a plurality of third nanoparticles NP3.

The first electrode EL1 may be disposed on an upper surface of the first filter region 421, the second electrode EL2 may be disposed between the first filter region 421 and the second filter region 422, the third electrode EL3 may be disposed between the second filter region 422 and the third filter region 423, and the fourth electrode EL4 may be disposed below the third filter region 423. The first and second electrodes EL1 and EL2 may be an electrode pair that applies an electrical signal to the first filter region 421, the second and third electrodes EL2 and EL3 may be an electrode pair that applies an electrical signal to the second filter region 422, and the third and fourth electrodes EL3 and EL4 may be an electrode pair that applies an electrical signal to the third filter region 423. That is, the first and second band-pass filters 421 and 422 may share the second electrode EL2 as an electrode, and the second and third band-pass filters 422 and 423 may share the third electrode EL3 as an electrode. By sharing the electrodes EL2 and EL3, the size of the filter may be reduced.

To reduce the influence of the electrode, each of the first to third nanoparticles NP1, NP2, and NP3 may be spaced apart from the adjacent first to fourth electrodes EL1, EL2, EL3, and EL4 by being surrounded by the first to third refractive index change layers RC1, RC2, and RC3. The first to third nanoparticles NP1, NP2, and NP3 having a periodic structure and the first to third refractive index change layers RC1, RC2, and RC3 have been described above, and thus, detailed descriptions thereof will be omitted.

Figure 9:
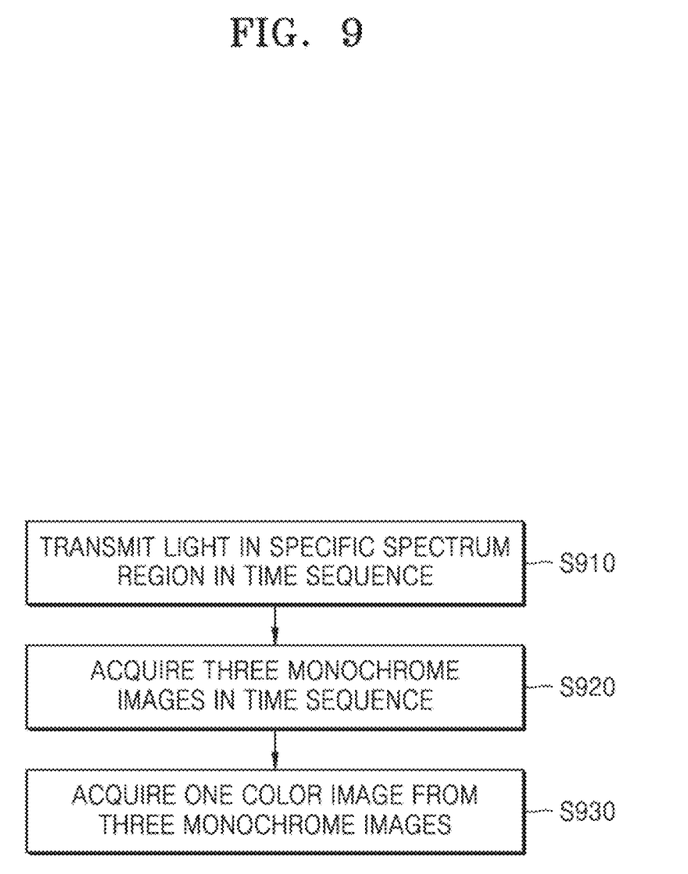
FIG. 9 is a flowchart illustrating an operation of a color imaging apparatus according to an embodiment.

FIG. 9 is a flowchart illustrating an operation of the color imaging apparatus 300 according to an embodiment The filter 320 time sequentially transmits only light of one spectral region (red, green, blue) by the processor 330 (S910). Each of the first to third band-pass filters 321, 322, and 323 is converted to a transmission mode or a filtering mode by the processor 330, and thus, only light in a spectral region passing through the filter 320 may be incident on the monochrome sensor 310.

For example, the filter 320 may be in a red transmission mode by the processor 330. That is, the second band-pass filter 322 and the third band pass filter 323 respectively may be in a filtering mode for filtering light in green and blue spectral regions, and when the second band-pass filter 322 is in a transmission mode, the filter 320 may be in a red transmission mode.

The filter 320 may be in a green transmission mode by the processor 330. That is, the first band pass filter 321 and the third band pass filter 323 respectively may be in a filtering mode for filtering light in the red and blue spectrum regions, and when the second band-pass filter 322 is in a transmission mode, the filter 320 may be in a green transmission mode.

The filter 320 may be in a blue transmission mode by the processor 330. That is, the first band pass filter 321 and the second band pass filter 322 respectively may be in a filtering mode for filtering light in the red and green spectral regions, and when the third band-pass filter 323 is in a transmission mode, the filter 320 may be in a blue transmission mode.

However, the monochrome sensor 310 time sequentially acquires three consecutive monochrome images of an object of interest by synchronizing with the filter 320 (S920). Depending on the configuration of the filter 320, the monochrome sensor 310 may serially acquire three monochrome images 340R, 340G, and 340B by detecting light in the red, green, and blue spectrum ranges, respectively.

Next, the processor 330 may acquire one color image 340 from the three monochrome images 340R, 340G, and 340B (S930). The processor 330 may convert three monochrome images into one color image by algorithmically merging the three monochrome images. Since the processor 330 does not perform a spatial shift with respect to the monochrome image, the one color image 340 may be acquired by merging of three monochrome images 340R, 340G, and 340B.

Figure 10:
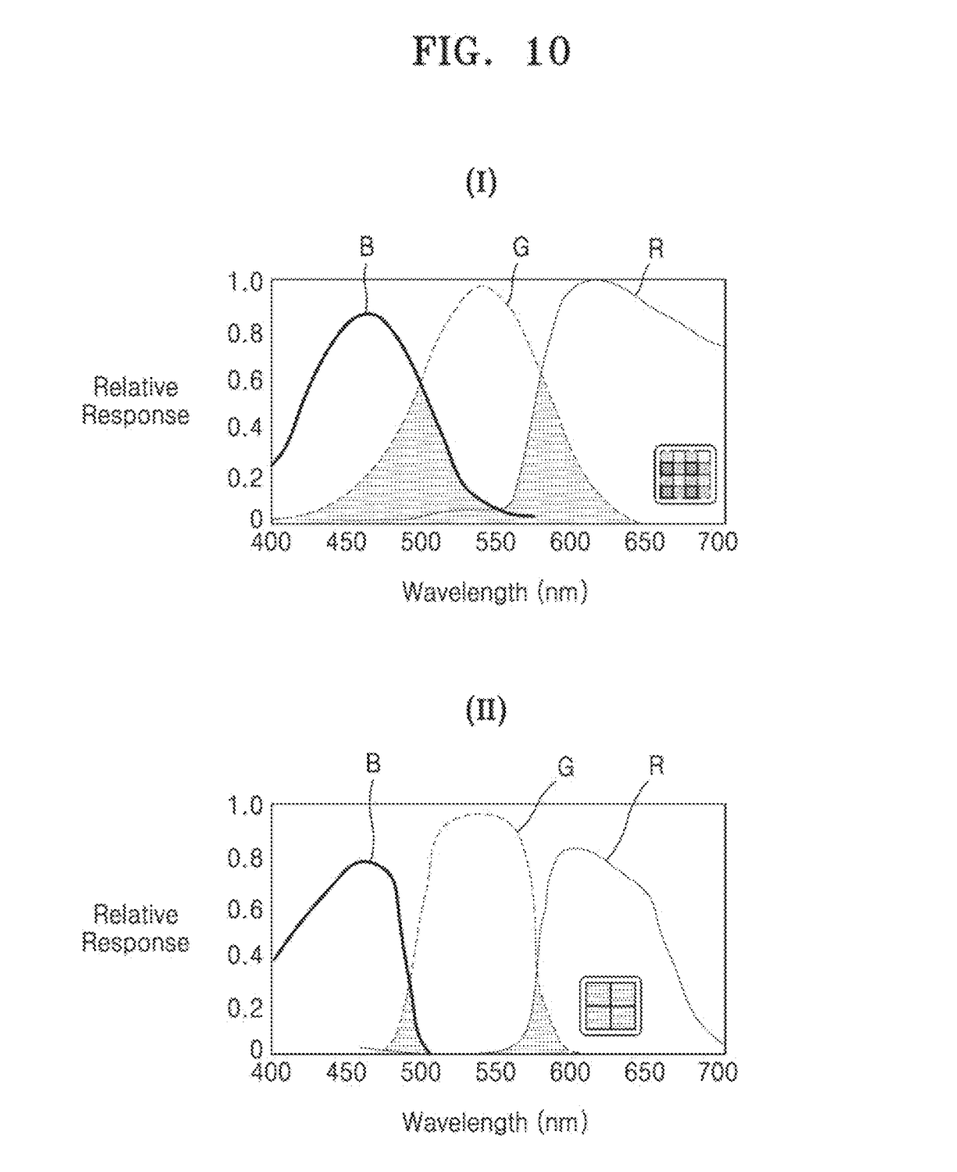
FIG. 10 is a simulation result of photoreaction according to wavelengths of a Bayer filter and a filter according to an embodiment.

FIG. 10 is a simulation result of photoreaction according to a wavelength of a Bayer filter and a filter according to an embodiment. In FIG. 10, diagram (I) shows photoreaction according to wavelengths of the Bayer filter, and diagram (II) shows photoreaction according to wavelengths of the filter 320 according to an embodiment. It may be seen that the filter 320 according to an embodiment has improved cut-off characteristics and less overlapping regions between wavelengths than the Bayer filter. Thus, the quality of color images may be improved.

Figure 11:
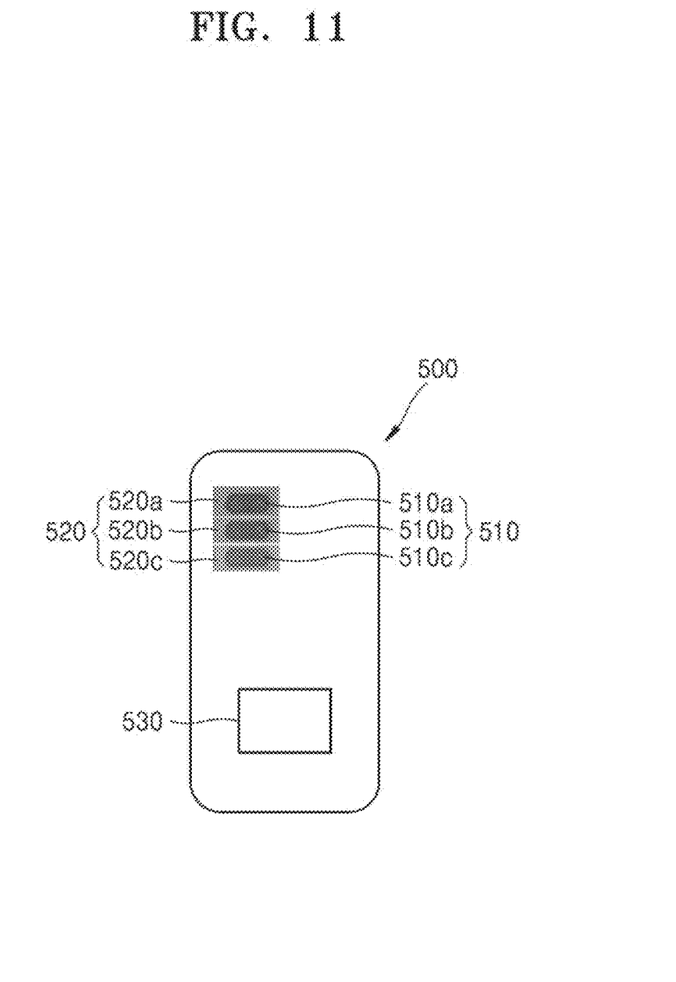
FIG. 11 is a diagram illustrating a color imaging apparatus including a filter having a meta-surface and a monochrome sensor according to another embodiment.

FIG. 11 is a diagram illustrating a color imaging apparatus 500 including a filter having a meta-surface and a monochrome sensor according to another embodiment. Referring to FIG. 11, the color imaging apparatus 500 may include a monochrome sensor array 510 configured to perform consecutively three-time exposures. For example, the color imaging apparatus 500 may include three monochrome sensors 510a, 510b, and 510c. Each of the monochrome sensors 510a, 510b, 510c has a meta-surface and is coated with a filter array 520 that time sequentially transmits light of different spectra. Each of first to third filters 520a, 520b and 520c included in the filter array 520 may be stacked one by one on surfaces of the monochrome sensors 510a, 510b, and 510c.

In the embodiment, the color imaging apparatus 500 may be used in a mobile device.

Each of the first to third filters 520a, 520b, and 520c, as described above, may include a first band-pass filter for filtering light in a red spectrum region, a second band-pass filter for filtering light in a green spectrum region, and a third band-pass filter for filtering light in a blue spectrum region, and the first to third band-pass filters may be disposed to overlap each other based on a light traveling direction. Each of the first to third band-pass filters may be in a transmission mode or in a filtering mode for filtering only light in a spectral region according to an electrical signal. The first to third band-pass filters have been described above, and thus, detailed descriptions thereof will be omitted.

Each of the first to third filters 520a, 520b, and 520c may be configured to be alternately turned on to transmit blue, green, and red spectral ranges.

For example, at a first time, the first filter 520a may transmit red light, the second filter 520b may transmit green light, and the third filter 520c may transmit blue light. Thus, at the first time, each of the first to third monochrome sensors 510a, 510b, and 510c may acquire a red image, a green image, and a blue image.

At a second time after the first time, the first filter 520a may transmit green light, the second filter 520b may transmit blue light, and the third filter 520c may transmit red light. Thus, at the second time, each of the first to third monochrome sensors 510a, 510b, and 510c may acquire a green image, a blue image, and a red image.

At a third time after the second time, the first filter 520a may transmit blue light, the second filter 520b may transmit red light, and the third filter 520c may transmit green light. Thus, at the third time, each of the first to third monochrome sensors 510a, 510b, and 510c may acquire a blue image, a red image, and a green image.

The processor 530 may acquire one color image by merging the nine monochrome images acquired in the first to third times. When merging the nine monochrome images, some of the nine monochrome images may be spatially shifted to compensate for a spatial difference between the first to third monochrome sensors 510a, 510b, and 510c. In this way, an image resolution may be increased greater than that of a color image acquired by three monochrome images.

However, the embodiment are not limited thereto. The processor 530 may acquire a first color image by merging the three monochrome images acquired at the first time, acquire a second color image by merging the three monochrome images acquired at the second time, and acquire a third color image by merging the three monochrome images acquired at the third time. The use of three monochrome images and three filters may increase a frame rate compared to using one monochrome image and three filters.

The filter array 520 transmits or filters light, but is not limited to transmitting or filtering red, blue, and green. In embodiments, the filter array 520 may transmit or filter light in a near-infrared or near-ultraviolet spectral range.

Accordingly, in addition to a color image of an object of interest, an additional image in a spectral range invisible to human eyes may be acquired by a combination of spatial and temporal multiplexing. The processor may algorithmically merge the monochrome images into one color image.

The color imaging apparatus described above may increase a signal-to-noise ratio.

The color imaging apparatus described above has a simple structure, and thus, may be easily applied to a mobile device.

It may be understood that embodiments described herein may be considered in a descriptive sense only and not for purposes of limitation. Descriptions of features or aspects within each embodiment may be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A color imaging apparatus comprising:
   a filter having a meta surface, and configured to transmit only light in a first spectral region, a second spectral region and a third spectral region in a time sequence;
   a monochrome sensor on which the filter is disposed, and configured to acquire three different monochrome images in the time sequence by being consecutively exposed three times in synchronization with the filter; and
   a processor configured to acquire one color image by separating the three different monochrome images and merging the separated three different monochrome images.

2. The color imaging apparatus of claim 1, wherein the filter comprises:
   a first band-pass filter configured to filter light in the first spectral region;
   a second band-pass filter configured to filter light in the second spectral region; and
   a third band-pass filter configured to filter light in the third spectral region,
   wherein the first band-pass filter, the second band-pass filter and the third band-pass filter are disposed to overlap each other in a light traveling direction.

3. The color imaging apparatus of claim 2, wherein each of the first band-pass filter, the second band-pass filter and the third band-pass filter is configured to operate in a transmission mode in which all of incident light is transmitted according to an electrical signal, and a filtering mode in which light in a corresponding spectral region is filtered.

4. The color imaging apparatus of claim 3, wherein the filter is further configured to, based on one among the first band-pass filter, the second band-pass filter and the third band-pass filter being in the transmission mode and a remaining two among the first band-pass filter, the second band-pass filter and the third band-pass filter being in the filtering mode, transmit light in a spectral region corresponding to the one among the first band-pass filter, the second band-pass filter and the third band-pass filter in the transmission mode.

5. The color imaging apparatus of claim 2, wherein each of the first band-pass filter, the second band-pass filter and the third band-pass filter comprises a repetitive periodic structure, and
   the repetitive periodic structure of each of the first band-pass filter, the second band-pass filter and the third band-pass filter is different from one another and defines light in a spectral region to be filtered.

6. The color imaging apparatus of claim 5, wherein the repetitive periodic structure of each of the first band-pass filter, the second band-pass filter and the third band-pass filter is arranged in a direction crossing a light traveling direction.

7. The color imaging apparatus of claim 5, wherein a period of each of the repetitive periodic structure of each of the first band-pass filter, the second band-pass filter and the third band-pass filter is less than a wavelength of light to be filtered.

8. The color imaging apparatus of claim 2, wherein each of the first band-pass filter, the second band-pass filter and the third band-pass filter comprises nanoparticles having a size less than a wavelength of light to be filtered.

9. The color imaging apparatus of claim 8, wherein the nanoparticles included in each of the first band-pass filter, the second band-pass filter and the third band-pass filter have different sizes from each other.

10. The color imaging apparatus of claim 8, wherein the nanoparticles comprise any one or any combination of Si, TiO2, GaP, GaN, SiC, ZrO2, and GaAs.

11. The color imaging apparatus of claim 8, wherein the nanoparticles included in each of the first band-pass filter, the second band-pass filter and the third band-pass filter are arranged in different cycles from one another.

12. The color imaging apparatus of claim 8, wherein the size of the nanoparticles included in the first band-pass filter is in a range from about 250 nm to about 500 nm.

13. The color imaging apparatus of claim 8, wherein the size of the nanoparticles included in the second band-pass filter is in a range from about 200 nm to about 400 nm.

14. The color imaging apparatus of claim 8, wherein the size of the nanoparticles included in the third band-pass filter is in a range from about 190 nm to about 300 nm.

15. The color imaging apparatus of claim 8, wherein each of each of the first band-pass filter, the second band-pass filter and the third band-pass filter further comprises:
   a refractive index change layer having a refractive index that is changed according to an applied electrical signal; and
   an electrode pair configured to apply an electrical signal to the refractive index change layer.

16. The color imaging apparatus of claim 15, wherein the refractive index change layer is in contact with the nanoparticles.

17. The color imaging apparatus of claim 15, wherein the nanoparticles are spaced apart from the electrode pair.

18. The color imaging apparatus of claim 15, wherein one among the electrode pair of the second band-pass filter is shared with one among the electrode pair of the first band-pass filter, and another one among the electrode pair of the second band-pass filter is shared with one among the electrode pair of the third band-pass filter.

19. The color imaging apparatus of claim 2, further comprising an insulating layer disposed either one or both of between the first band-pass filter and the second band-pass filter and between the second band-pass filter and the third band-pass filter.

20. A mobile device comprising the color imaging apparatus of claim 1.

* * * * *